United States Patent [19]

Grone et al.

[11] 4,411,579
[45] Oct. 25, 1983

[54] EJECTION MEANS FOR REMOVING A HOLLOW ARTICLE FROM MACHINE IN WHICH THE ARTICLE IS MADE

[75] Inventors: Robert J. Grone, Elsmere, Ky.; Leonard R. Schnell, Okeana, Ohio

[73] Assignee: Cincinnati Milacron Industries, Inc., Cincinnati, Ohio

[21] Appl. No.: 301,775

[22] Filed: Sep. 14, 1981

[51] Int. Cl.³ .............................................. B29C 3/00
[52] U.S. Cl. ................................ 414/417; 425/403.1; 164/344
[58] Field of Search ........................ 425/403.1, 394; 414/416, 417, 729; 100/218; 164/344, 347; 198/484

[56] References Cited

U.S. PATENT DOCUMENTS

| 2,253,651 | 8/1941 | Ring | 164/347 X |
| 2,962,178 | 11/1960 | Exline | 414/417 |
| 3,954,186 | 5/1976 | Hafele | 414/729 X |
| 4,132,319 | 1/1979 | Padovani | 414/417 X |
| 4,133,625 | 1/1979 | Kellermann et al. | 425/394 |

FOREIGN PATENT DOCUMENTS 2067938 1/1980 United Kingdom .

Primary Examiner—Joseph E. Valenza
Assistant Examiner—Terrance L. Siemens
Attorney, Agent, or Firm—Daniel P. Worth

[57] ABSTRACT

An improvement in the ejection means or ejection station of the machine described in U.S. Pat. No. 4,133,625. The improved structure employs a finger with a resilient (e.g. rubber) face or a similar striking instrument to strike the inside of the cup, tub or other hollow object being made and knock it loose and into a predetermined trajectory so that the product can be recovered with no damage to its finish. In accomplishing this, the finger is mounted on a vertically moving yoke that engages the carrier plate-tip ring assembly to which the product is temporarily adhered. With this construction, the finger strikes the product and knocks it loose during motion of the frame.

7 Claims, 10 Drawing Figures

U.S. Patent  Oct. 25, 1983  Sheet 1 of 4  4,411,579
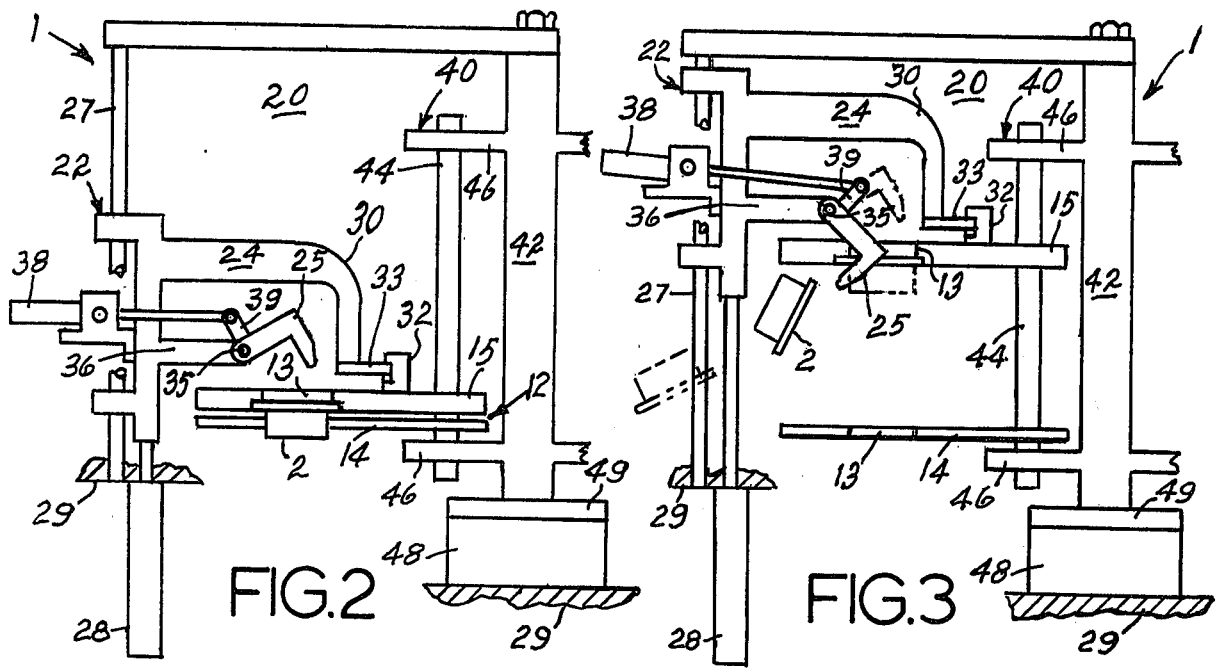
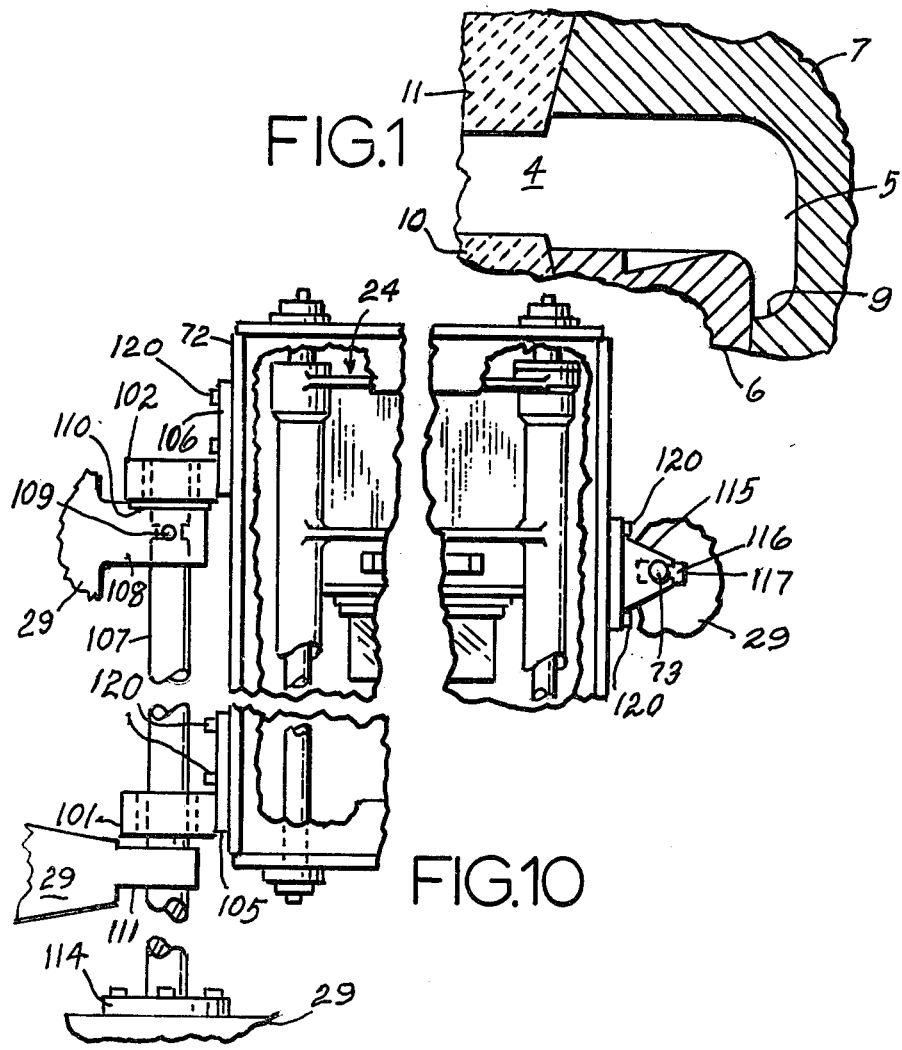

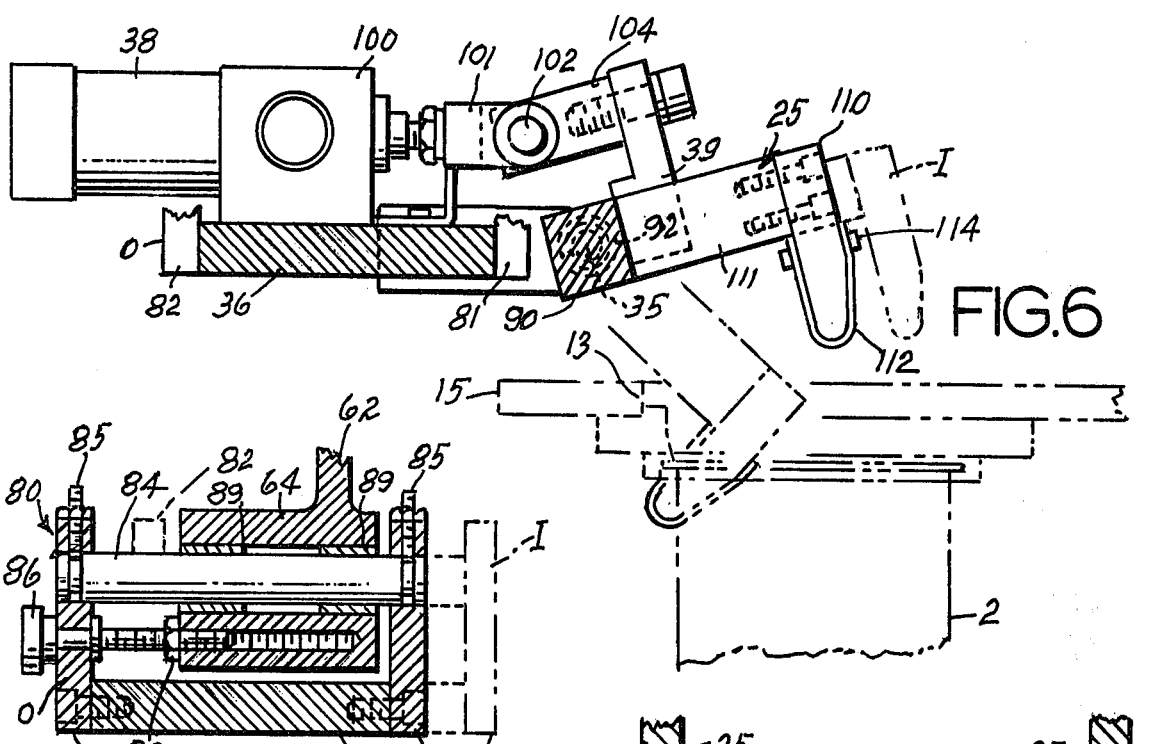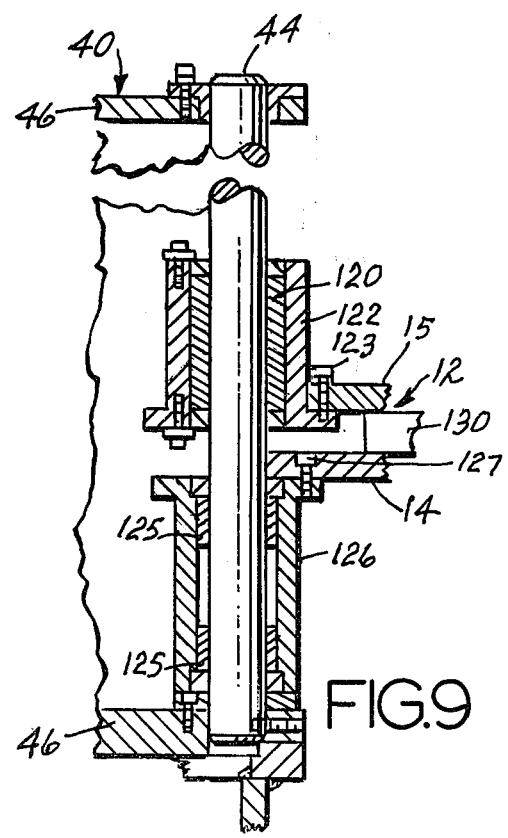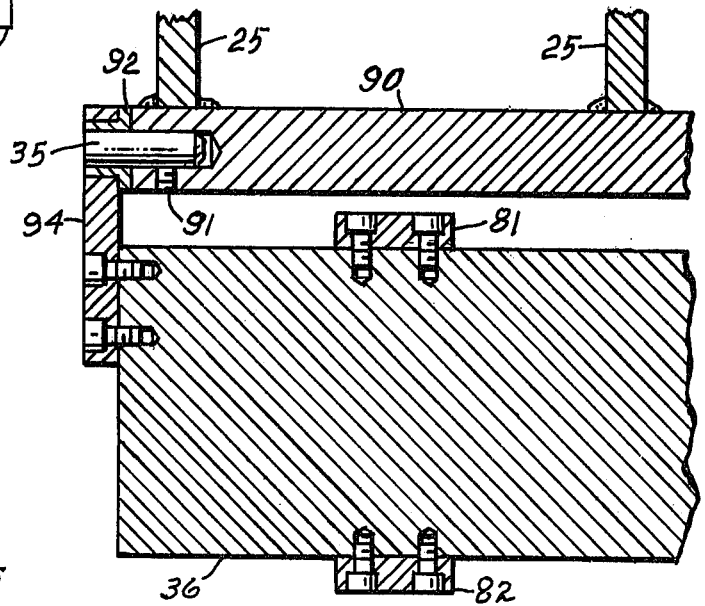

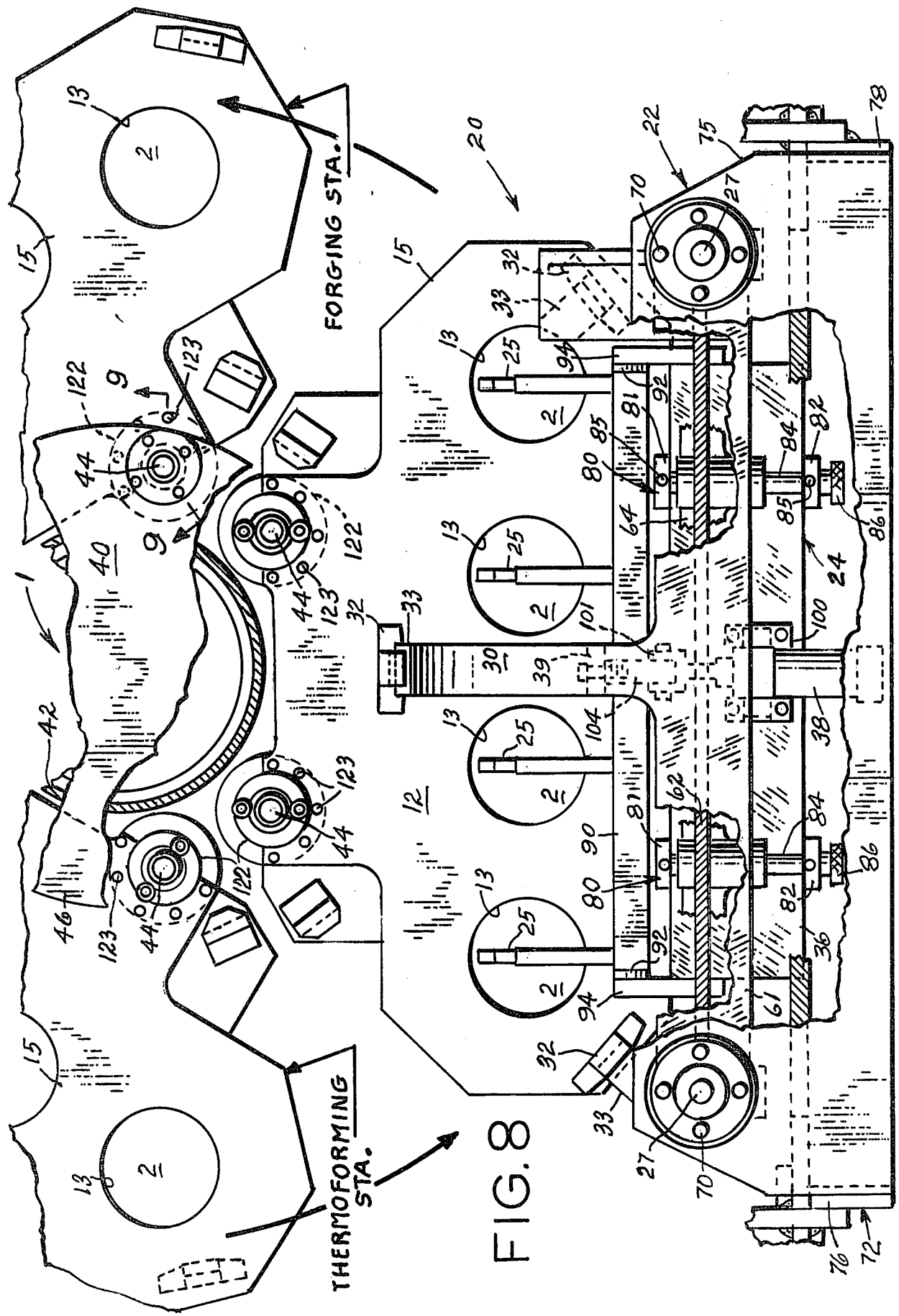

EJECTION MEANS FOR REMOVING A HOLLOW ARTICLE FROM MACHINE IN WHICH THE ARTICLE IS MADE

This invention relates to an ejection means for removing a hollow article from the machine in which the article is made. An aspect of the invention is an ejection means for removing a biaxially oriented plastic hollow container such as a wide mouth jar, tub, or can from the machine in which it is made. An aspect of the invention is an improved ejection means for use at the ejection or removing station of a hollow article manufacturing machine. An aspect of the invention is an ejection means for removing a hollow article such as a tub or wide mouth jar or cup or other item with a wide mouth from an upper forming ring in a machine for making automatically and simultaneously one or more biaxially oriented plastic hollow articles in connection with which the invention is described.

The invention is an improvement in the ejection means disclosed in U.S. Pat. No. 4,133,625 issued to Kellermann and McDonald. Said patent is expressly incorporated herein by reference and discloses a machine for automatically forging and thermoforming a hollow thermoplastic biaxially oriented article such as a tub or can. The machine taught there has three work stations, two of which shape the product by forging and thermoforming. The third work station is the ejection means. The present invention provides an ejection means which may be used in said machine in lieu of the one taught in said patent.

The ejection station taught in said patent dealt with the problem of removing the product without damage thereto and while maintaining positive control over the movement and removal of the product. To do this, vacuum cups strip the hollow article out of the upper lip ring and grippers move the hollow article or product from the vacuum cups and also from between the carrier plates. It was learned that the product would remain in the upper lip ring and required considerable force to pry loose from the upper lip ring.

It has been discovered that a hollow article of the type contemplated may be removed by knocking it out with a blow from a resiliently faced finger or hammer. In order to accomplish this a different mechanism with different concepts is provided as an ejection means suitable for use in the machine taught in said patent and in similar applications. The present invention is concerned with such a mechanism and affords the advantages of timing that is less critical and less likely to effect machine cycle time as well as being of simple construction and requiring few parts.

Very briefly, the present invention provides an ejection means that knocks the product (the hollow article) loose from its upper forming ring. The ejection means is mounted on a moving platform. The platform engages and separates the carrier plates while positioning the ejection means for the blow which removes the article. The ejecting blow takes place during motion of the platform after the carrier plates have been separated sufficiently to permit the hollow article to be struck out between them. The trajectory of the hollow article is sufficiently predictable that it leaves the machine at a point where other devices with which this invention is not concerned take over the handling of the hollow article.

Objects of this invention include provision of an improved ejection means and a different ejection means, and providing a means that employs a predictable trajectory instead of positive mechanical control over the product as an instrument for removing the product.

Other objects, advantages, and features can be ascertained from the following disclosure when read in connection with the annexed drawings wherein:

FIG. 1 includes FIG. 28 of said patent and is an enlarged schematic cross-section showing the manner in which the upper tooling ring has an undercut relationship with the lip on the product;

FIG. 2 is a schematic side view of the present invention showing the parts in the position assumed when the product arrives at the ejection station;

FIG. 3 is a schematic side view of the ejection station of FIG. 2 showing the positions assumed when the product is being ejected;

FIG. 5 is an enlarged vertical section taken along 5—5 of FIG. 4 showing the manually positionable mounting means of the finger, the platform on which it is mounted, and the yoke to which it is mounted;

FIG. 6 is an enlarged vertical section along 6—6 of FIG. 4 showing the relationship between the finger, the shaft along which a plurality of fingers is mounted and the power means which operates the fingers to strike the ejecting blow;

FIG. 7 is horizontal enlarged section along 7—7 of FIG. 4 showing the manner in which the plurality of fingers is mounted rotatably to the platform;

FIG. 8 is a top view of the ejection means of FIG. 4;

FIG. 9 is along section 9—9 of FIG. 8 showing a preferred embodiment for mounting the upper carrier plate to the lower carrier plate.

FIG. 10 is a partial cutaway front view showing a preferred modification of FIG. 4 whereby the frame and ejection means mounted therein is swingably supported so that it may be swung out from the machine frame.

Figure 4:
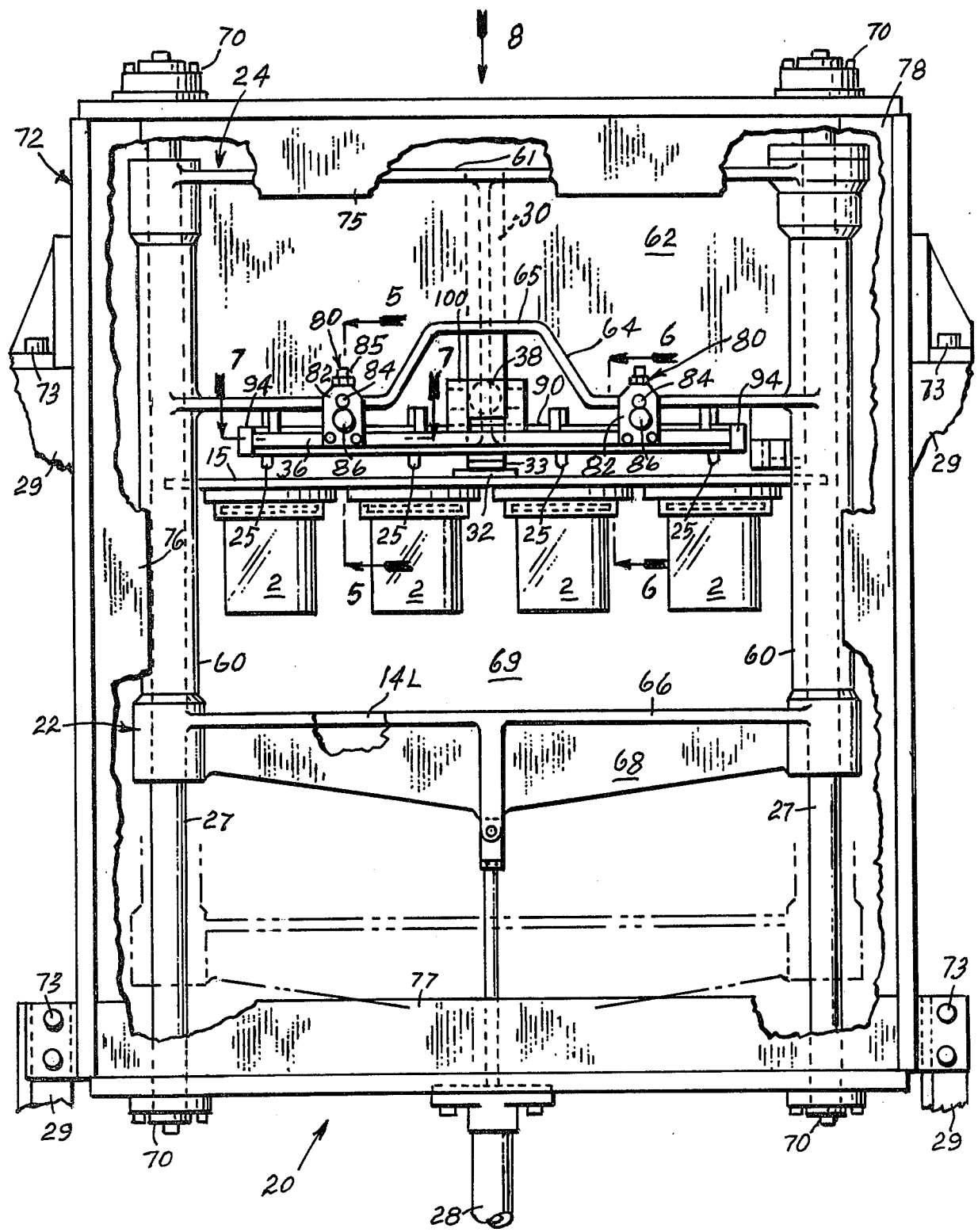
FIG. 4 is a front elevation view (e.g. from the left side of FIGS. 2,3) of a preferred embodiment of an ejection means constructed according to the invention.

FIGS. 1,2,3 are presented to facilitate explanation of the invention and how it works. The remaining FIGS. depict a preferred embodiment. FIGS. 2 and 3, for simplicity, illustrate a single lane machine (i.e. one adapted to make only one product at a time) whereas the other FIGS. present a four lane machine. Dotted lines or ghost images depict alternate or end positions of parts in FIGS. 4,5,6.

After the final product is formed (thermoformed) at the second work station, the machine indexes once more and moves it to the eject station 20 (FIGS. 2,3,4,8) where the present invention 22 is employed to strike the product 2 and knock it loose and into a trajectory whereby it flies free of the machine.

SUMMARY OF PRESENT INVENTION (FIGS. 1-3)

The ejection means 22 of the present invention uses a yoke assembly 24 to engage and separate the upper and lower carrier plates 14,15 by lifting the upper carrier plate 15 a vertical distance from the FIG. 2 position to that of FIG. 3. The finger 25 is mounted on the yoke assembly and is operated during the lifting to move through hole 13 and strike the product 2 when the plates are separated sufficiently as in FIG. 3 thus knocking the product into its trajectory. The operations take place, of course, after the carrier plates 12 index to the ejection station and have come to a stop as in FIG. 2.

Yoke assembly 24 is slidably mounted on vertical guide rods 27. A double acting hydraulic cylinder constitutes a first power means 28 that is secured to the machine frame 29 and reciprocates the yoke assembly up and down thereby to achieve the requisite carrier plate lifting and separation. A cantilever arm 30 depicted as hook-shaped is part of the yoke 24 and extends generally radially inward so that the carrier lifting lugs or lifter blocks 32 (secured to upper carrier plate 15) are engaged by yoke lifting or pickup lugs 33 supported on the yoke, only the radially innermost block 32 and lug 33 being depicted in FIGS. 2,3. The block 32 and lug 33 are preferably as described in FIG. 30 of said patent.

Finger 25 is pivotally supported by and/or on shaft 35 to swing through an arc sufficient to pass the product-striking part of the finger through lip ring hole 13 and against the inside of the product 2 whereupon the latter leaves the ejection means 22 via its predetermined trajectory. A platform 36 is secured to and a part of the yoke assembly. The finger and its power means 38 are mounted on platform 36 thusly moving with it while being capable of operating independently. Second power means 38 (preferably a double acting pneumatic cylinder) drives the finger 25 through said arc as aforesaid by means of crank 39. By mounting the finger 25 and its power means 38 on the yoke 24, the product-striking act occurs while the yoke and carrier plates 12 are being moved. This simplifies the machine timing, e.g., eliminating the need for a dwell interval if the finger swings about a static axis while the yoke 24 moves the carrier 12 up to it.

As further described in said patent, each carrier assembly 12 is supported in cantilever fashion from a carrier support means 40 which is in turn secured to the vertical drive shaft 42 of the machine 1. Each carrier support means (for each carrier assembly 12) comprises a pair of vertical support pins 44 secured between flanges 46, which in turn are vertically spaced along the drive shaft 42. The shaft 42 is indexed 120 degrees periodically by indexing drive 48 which outputs through an overload clutch 49 and is secured to the machine frame 29. Preferably an indexing drive 48 such as made by Camco is used although other makes such as Ferguson may be used.

The guide rods actually are secured into a vertical frame comprising a rectangular frame made of pieces having either angle iron or channel iron configuration for rigidity. This frame, as shown in FIG. 4 is bolted or otherwise secured to the base or frame of the machine.

PREFERRED EMBODIMENT OF FIGS. 4–9

As seen in FIGS. 4 and 8, various portions of the flanges and webs are cut away to provide a better view of other parts of the ejection station.

The yoke assembly 24 is preferably a generally rectangular aluminum casting which includes the lifting cantilever 30 extending radially inward. As seen in FIG. 4, the rectangular shape includes at each side a tubular bearing housing 60, in which are mounted suitable bearings, e.g., ball bushings, to permit same to slide up and down on the guide rods 27. At the top, the yoke has a structure with an I beam sort of cross section consisting of a top flange 61, web 62, and intermediate flange 64. The intermediate flange 64 instead of running straight across is arched at the middle 65 to provide access to other machine parts. At the bottom of yoke 24 is a bottom flange 66 and web 68 to the center of which is connected the hydraulic cylinder 28. There is a window or space 69 providing access to the carrier plate, platform, etc. between the intermediate and bottom flanges. FIG. 4 has a partially cut away bottom flange web to illustrate in dotted line the position of the lower carrier plate 14L relative thereon.

The guide rods 27 are secured by suitable means such as nuts and retainer rings 70 to a generally rectangular frame 72 (FIG. 4) which is itself in turn secured by suitable means such as bolts 73 to the machine base 29. Rectangular frame 72 is preferably welded and has flanged and webbed members 75,76,77,78 extending along each side and at the top and bottom, respectively. These members are preferably shaped like an I-beam or angle and the overhanging flange is used to connect the guide rods.

The finger 25 and actuating cylinder means 38,39 are mounted on the platform 36 (FIGS. 5,6,7) which is in turn supported from the yoke. In this manner, the fingers can be operated while the yoke is moving vertically. The platform 36 is preferably bolted to a pair of horizontally spaced-apart platform assemblies 80 which each consist of inner and outer platform hangers 81,82 suspended from a horizontal support rod 84. Set screws 85 insure the location of the hangers on the rod. A horizontal adjusting screw 86 engages threads in flange 64, has a locking means such as locknut 88, and adjusts the platform in and out, thereby adjusting the place at which the fingers 25 strike the product 2. Both FIGS. 5 and 6 show in dotted lines or ghost image the radially inner positions I of the platform and finger, respectively, while solid lines are used to denote the radially outer position 0. The support rods have a round section and slide in suitable bearings 89 which latter are in intermediate flange 64 of the yoke 24 to maintain platform support while at the same time allowing the requisite adjusting action.

In the preferred embodiment, the machine 1 is constructed to make four hollow products at a time. Thus, there are provided (FIGS. 4,7,8) four fingers 25 which are moved in unison because they are all welded to a single horizontal rectangular cross-sectioned (preferably square) shaft 90 which extends laterally across the ejection means. Referring to FIG. 7, at the end of each square shaft 90 (FIG. 7) a set screw 91 secures the shaft bearing member 35 (e.g. FIGS. 2,3,6) into the shaft which is in turn mounted in a suitable journal bearing 92. A finger bracket 94 supports each journal 92 and is bolted to the end of each platform 36 (FIG. 7).

As illustrated in FIG. 6, the finger operating cylinder 38 is mounted between a pair of trunion blocks 100 so that it can pivot through a vertical arc as needed during its operation. The plunger of cylinder 38 is connected by a clevis and pin 101,102 in known manner (via spacer block 104 which is bolted) to the bell crank 39 so that the finger shaft is operated. Actually, each finger 25 is welded to the rectangular shaft to transmit the cylinder actuation thereto.

Each finger 25 is shaped like a hammer, having a head 110 for striking the product and a handle 111 to connect the head to the rectangular operator shaft 90. Also, head 110 is provided with a resilient covering means 112 on its face so that the opportunity to damage the product is minimized. In the preferred and depicted embodiment, the resilient means may comprise, e.g. material selected from the class consisting of natural and synthetic rubbers and elastomers, padding of cloth and soft filler spinger rubber, fluid filled soft or resident coverings, etc., a strip of soft sponge rubber is held on the striking portions of the head by a plurality of bolts 114.

A PREFERRED EMBODIMENT OF CARRIER SUPPORT (FIG. 9)

The carrier plate assembly of said patent may be used with the present invention, but preferably a modified arrangement as presented in FIG. 9 is employed. The biggest difference is that the upper carrier plate 15 is unconnected to the rods 44. Thus, rods 44 provide guide means, locating means, and the like and permit, if one desires, the elimination of various leader pins, locating pins and so forth so that the two carrier plates are re-aligned each time the upper plate is lowered to the lower plate—indeed alignment is maintained during lifting and restoring. In FIG. 9, the upper plate 15 is provided with a sliding bearing 120 which is fitted in a flanged bearing housing 122 that in turn is secured to the plate 15 by a plurality of bolts 123 or similar means.

A similar structure 125,126,127 is used to support the lower carrier plate 14 from the rods 44.

It is desirable to provide spacer members 130 at a plurality of locations between the two plates. These spacers are normally of precision thickness so that the plates are kept in parallel relation and an exact space apart, according to the vertical dimensions of the lip rings.

PREFERRED MOUNTING MEANS (FIG. 10)

FIG. 10 illustrates a preferred way of mounting the ejector frame 72 and entire ejection means 24 so it may be swung away from the ejection work station and machine frame 29. Ejector frame 72 has middle and upper swing bearings 101,102 (actually a bearing or pillow block with bearing inside) supported by brackets 105,106 outwardly from one side of frame 72 (to the left side as seen in FIGS. 4,10) along a vertical pin or axle 107. Upper swing bearing 102 rests on upper bearing support 108 which is in turn either integral with or fixed to the machine frame 29. There is also provided a middle shaft support 111. A set screw 109 fits in a groove notch in shaft 107 at upper bearing 102. A thrust bearing 110 is preferably provided between the upper swing and support bearings 102,108. The remainder of the weight of the axle 107 is supported in a retainer or lower support 114 from the machine frame or base 29, although it may be rested on the ground or machine foundation. Frame 72 swings relative to the axle 107. In a sense, this resembles the common pin and barrel hinge found on most doors.

A latch bracket 115 on the opposite side of the frame 72 serves to hold the frame, hence ejection means 24, in place. The latch bracket 115 has a machined face on the side away from the viewer (i.e. side to rear of FIG. 10) which registers in face-to-face relation with a machined face 116 on the boss 117 on the base 29. A bolt 73 passes through latch bracket 115 into a tapped hole in face 116, thus securing all in alignment.

By swingably mounting as described, it is a simple operation to swing out the entire ejection means away from the frame to inspect, service, etc. either the ejection means or the other work stations. Yet, the bracket latch serves to realign the entire system with the remainder of the machine. The use of bolts 73,120 to secure the various brackets to adjoining parts facilitates assembly and proper alignment.

REVIEW

While it is believed that the operation of the invention should be evident from the above, especially when read in conjunction with said patent, a brief review thereof will take place.

During manufacturing operations, the motor 48 indexes the machine so that the carrier plates 12 are swung into the position illustrated schematically in FIG. 2 and also in FIGS. 4 and 8. The plates are unlocked by the time they have stopped in the FIG. 2 position, thus they may readily be separated from each other; also the various lug means 32,33 are engaged so that the lifting action can take place. Note that the preferred embodiment of FIGS. 4,8 provide at least three such lifting means 32,33 which are arranged, constructed, and operated as described in said patent.

Anyway, with things in the FIG. 2 position, the cylinder 28 is actuated whereupon the yoke is caused to rise and move from the lowermost position of FIG. 2 and the lower dotted position 14L of FIG. 4 up to the eject position of FIG. 3 which is also the solid line position of FIG. 4. Preferably somewhere near the top of its stroke and in any event when there is sufficient clearance to permit the product 2 to fly free of the machine, the cylinder 38 is actuated whereupon the fingers 25 are moved through an arc and strike the product, thus knocking it loose and out of the machine, as illustrated in FIG. 3. Thereafter, the cylinder 38 returns the fingers to their original position by reversely rotating the square shaft 90 and the cylinder 38 operates so that the yoke 24 is lowered and the upper plate, now bereft of its product, is settled back on the lower carrier plate 14 in proper alignment for the next operation. Thereafter, the carrier plates 12 are swung to the forging station where activity as described in said patent then takes place and another set of plates 12 is swung into the eject station 20 from the thermoforming station.

What is claimed is:

1. An ejection means for removing a hollow article such as a cup from an upper one of a pair of rings mounted in a carrier plate comprising
   a pair of vertically extending guide rods;
   a yoke slidably mounted on said guide rods for vertical motion;
   first power means to reciprocate said yoke up and down on said guide rods, said power means being located beneath said yoke;
   a pair of carrier plates including a lower carrier plate and an upper carrier plate supported on said lower carrier plate, each of said carrier plates having a hole therethrough in register with the hole in the other plate;
   a plurality of carrier lifting lugs extending upwardly from the upper surface of said upper carrier plate;
   indexing means to move said carrier plates into an eject work station adjacent said yoke for ejection therefrom of cups carried therein;
   a plurality of yoke lifting lugs supported from said yoke in position to be engaged by the carrier lifting lugs supported on said carrier plates by the time the indexing means has moved the carrier plates into said ejection position;
   said upper ring being mounted on said upper plate surrounding said hole therein and in a position facing said lower carrier plate;

a finger pivotally mounted on said yoke in a position to strike the inside of the article through the hole in the upper carrier plate;

second power means mounted on said yoke to operate said finger; and a resilient surface on the striking face of said finger.

2. Apparatus in accordance with claim 1 further comprising the carrier plates each having a plurality of said holes arranged in register;

a plurality of rings mounted in said upper carrier plate, each surrounding a corresponding hole in said carrier plate; and a corresponding plurality of said fingers, each being mounted with reference to a corresponding one of said rings to strike the inside of an article formed therein as aforesaid.

3. Apparatus according to claim 1 further comprising said resilient surface being selected from the class consisting of natural and synthetic rubbers and elastomers and equivalents thereof.

4. An ejection means for removing a hollow article such as a cup from an upper ring which is mounted in a carrier plate comprising a guide means extending in a direction generally normal to the plane of carrier plate motion;

a yoke slidably mounted on said guide means;

first power means to reciprocate said yoke on said guide means;

a pair of carrier plates including a lower carrier plate and an upper carrier plate supported on said lower carrier plate, each of said carrier plates having a hole therethrough in register with the hole in the other plate;

carrier lifting engagement means lugs extending upwardly from said upper carrier plate;

means to move said carrier plates into an eject work station adjacent said yoke for ejection therefrom of cups carried therein;

yoke lifting engagement means supported from said yoke in position to be engaged by the carrier lifting engagement means by the time the means to move has moved the carrier plates into said ejection position;

said upper ring being mounted on said upper plate facing said lower carrier plate and surrounding said hole therein and in a position facing said lower carrier plate;

a finger pivotally mounted on said yoke in a position to strike the inside of the article through the hole in said upper carrier plate; and second power means mounted on said yoke to operate said finger.

5. Apparatus in accordance with claim 4 further comprising the plates having a plurality of said holes arranged in register;

a plurality of rings mounted in said upper carrier plate, each surrounding a corresponding hole in said carrier plate; and a corresponding plurality of said fingers, each being mounted with reference to a corresponding one of said rings to strike the inside of an article formed therein as aforesaid.

6. Apparatus in accordance with claims 1 or 4 further comprising means for swingably mounting said frame relative to said machine base so that said frame may be swung relative thereto.

7. Apparatus in accordance with claim 6 further comprising latch means for removably securing said frame in register with said machine base.

* * * * *